March 28, 1950
E. ERICKSON
2,502,134
METHOD FOR DRYING PROTEIN
Filed June 17, 1947
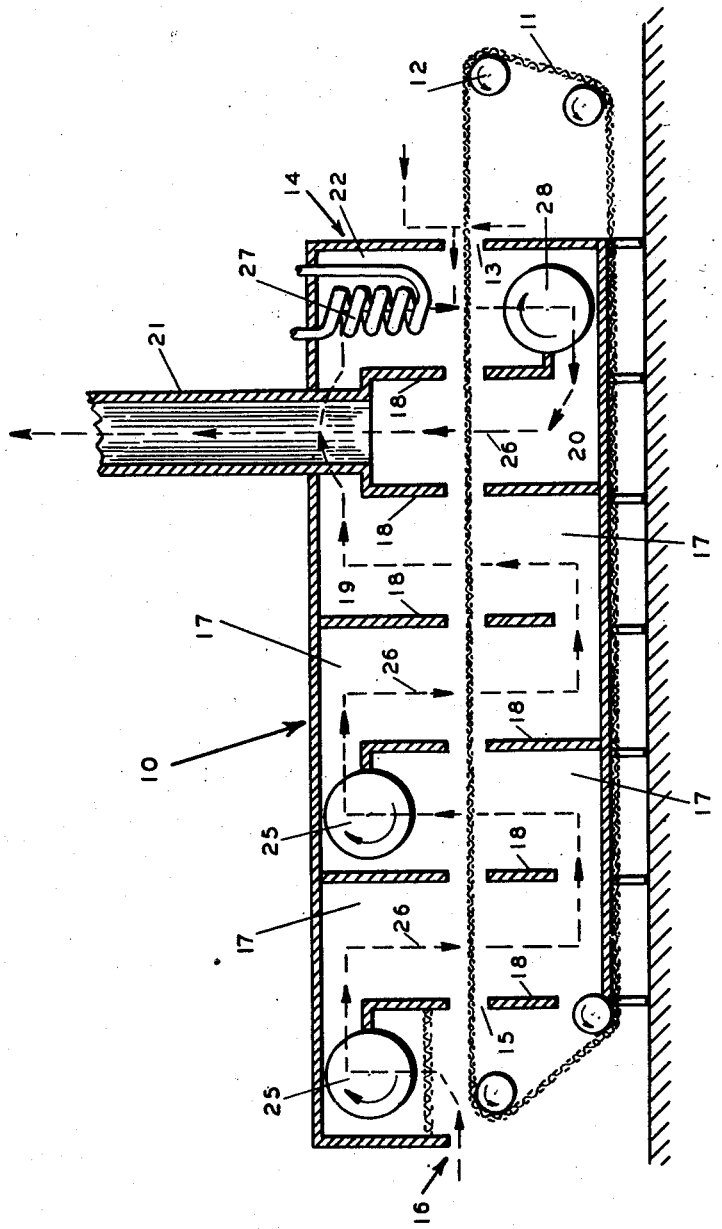
EWALD ERICKSON
INVENTOR.
BY Ernest G. Peterson
AGENT Patented Mar. 28, 1950

2,502,134

UNITED STATES PATENT OFFICE 2,502,134

METHOD FOR DRYING PROTEIN

Ewald Erickson, Watertown, Minn., assignor to Hercules Powder Company, Wilmington, Del., a corporation of Delaware Application June 17, 1947, Serial No. 755,061

2 Claims. (Cl. 34—33)

This invention relates in general to improvements in a method for drying protein curd materials.

In drying proteinaceous material such as, for example, casein, soybean protein and the like, it is conventional to pass protein curds on a moving screen through a dryer and at the same time to force heated drying air through the machine in such a manner that it passes countercurrently through the compartments. Finally, the drying air is passed upwardly through the screen to an air outlet or stack.

Now in accordance with this invention, the drying of protein materials is improved by a method in which the drying chamber is divided into adjacent compartments and passing the drying air substantially vertically therethrough, progressively conutercurrently to the protein material, reheating the exit drying air from the drying chamber and circulating the reheated air in a downward direction under suction through the incoming protein material and thence to the air outlet, whereby the incoming protein material is quickly preheated and may be passed through the drying apparatus more quickly and in a substantially thinner sheet than has heretofore been found practicable.

Having now indicated in a general way the nature and purpose of the invention, there follows a more detailed description of preferred embodiments thereof with reference to the accompanying drawing in which:

Figure 1 is a diagrammatic side elevation of an improved drying apparatus according to a preferred embodiment of this invention.

The drying apparatus generally designated 10 comprises a large drying chamber or tunnel and has passing therethrough a continuous protein-bearing screen 11 supported and adapted to be propelled by rollers 12. The screen 11 is adapted to pass into an opening 13 in one end of the dryer designated, for convenience, the protein feed end 14 and to pass out through an opening 15 in the opposite end of the dryer designated, for convenience, the protein outlet end 16. Within the dryer and adjacent to protein outlet end 16 are a series of drying compartments 17 separated by baffles 18, and near the protein intake end 14 is an exit chamber 19. An air outlet compartment 20 is positioned within exit chamber 19 and feeds into a stack 21 which is adapted to carry away the outlet air from the dryer. Directly adjacent to the protein intake end 14 of the dryer and surrounding intake opening 13 is a protein preheating chamber 22 which is adapted to feed from exit chamber 12 and into air outlet compartment 20.

A plurality of fans 25 or the like are mounted in the dryer and adapted to force a current of drying air through the dryer in a path indicated by broken line 26, the air passing in turn through drying compartments 17 and exit chamber 19, thence downward through protein preheating chamber 22 and finally upward through air outlet compartment 20 and out through stack 21, the direction of circulation of the drying air being generally vertical, alternately up and down, and progressively countercurrent to the direction of passage of protein through the dryer. Means for maintaining the drying air at desired raised temperatures such as, for example, steam heaters or the like (not shown) may, if desired, be placed at various spots; there is also provided a means for reheating the moisture-laden drying air such as, for example, a steam heating coil 27 in exit chamber 19 and located along the path of the drying air prior to its place of entry into protein preheating chamber 22. A suction-type air fan 28 is positioned at the base of chamber 22 and is adapted to pull the drying air through chamber 22 and eject it into air outlet compartment 20.

In operation, protein is fed onto screen 11 and the screen is caused to move steadily through the dryer 10 at a controlled speed, whereby a layer or sheet of wet protein curd is carried through the dryer first through protein preheating chamber 22 and subsequently through the remainder of the dryer including drying compartments 17; simultaneously, a current of dry air heated somewhat above room temperature, for example, between about 150° and about 200° F., and preferably at different, controlled temperatures in each compartment, is passed countercurrently through the dryer whereby in compartments 17 the moisture in the protein curd is removed and dried protein is obtained from the protein outlet end 16 of the dryer. After passing through compartments 17, the exit drying air which then is heavily moisture-laden is reheated by the reheating means such as, for example, steam coil 27, and the reheated exit drying air then is drawn downwardly through the layer of protein curd in protein preheating chamber 22. After passing through screen 11 in chamber 22, the air is forced into air outlet compartment 20 and out through stack 21.

Several advantages are attained in the preheating chamber 22. When the wet protein curd is introduced into this chamber, it is quickly preheated by contact with the heavily moisture-laden exit drying air; the high moisture content of this air results in an extremely high heat content or calorie content per cubic foot of air, whereby the incoming protein curd is preheated in an unusually short period of time. This rapid preheating of the protein curd not only means that the time of passage through the preheating chambers can be extremely short, but also results in the formation of a thin but firm crust on the layer of protein curd. Since the direction of the flow of air is downward through the screen, the layer of the protein curd is forced into close contact with the screen at the same time during which the firm crust is being formed on the wet curd, with the result that the protein layer is subsequently firmly retained on the screen and resists subsequent upward air currents. A further advantageous result attained in the preheating chamber derives directly from the fact that the downwardly-moving reheated exit drying air is drawn through the preheating chamber rather than being forced through the chamber. The use of a suction-type fan for this purpose means, of course, that there is a slight suction within the preheating chamber 22 so that there is a tendency for the outside atmosphere to be drawn through opening 13 rather than a tendency for the air to be forced out through the opening as would occur if air were forced through a chamber adjacent to an opening. This improvement not only gives an increased efficiency by preventing leakage of the air but also prevents air resistance through and near opening 13 from scattering the incoming wet protein curd.

By virtue of the fact that the layer of protein on screen 11 is packed closely against the screen and has the protective crust formed thereon, the protein layer according to this invention is characterized by being strongly resistant to deformation by subsequent upward air currents and the formation of blow holes in the drying chambers with the resultant diverting of drying air through such blow holes. The tendency to form these holes has previously been a limiting factor necessitating a relatively thick layer of protein curd on the screen, thus requiring a prolonged passage time of the protein through the dryer in order to insure thorough drying. According to the present invention, an extremely thin layer of protein curd may be placed on the screen and, therefore, the passage time may be considerably reduced; since the reduction of the passage time is greater proportionally than the reduction of the depth of the layer of protein curd, the net result of the decreased layer thickness is that the output of a dryer may be substantially increased in terms of amount of protein dried per unit time, while at the same time the protein is exposed to the elevated drying temperatures for a substantially shorter time and, therefore, has a decidedly lesser tendency to deteriorate during the drying operation.

It has been found that the advantages of this invention can be realized within limits of humidity in the preheating air; thus, a lower moisture content fails to attain these advantages, while a higher moisture content results in excessive hardening of the protein surface. Surprisingly, the exit drying air from normal operation of the dryer has this optimum moisture content.

The new process according to this invention is adapted for use in the drying of all types of materials such as, for example, casein, soybean protein, other animal and vegetable proteins and the like.

What I claim and desire to protect by Letters Patent is:

1. In a method of drying protein wherein a soft protein curd is fed through a dryer on a foraminous belt, the improvement comprising passing drying air through the dryer vertically and generally countercurrently to the direction of passing protein therethrough, reheating the heavily moisture-laden exit drying air and drawing the reheated air downwardly through the protein curd to form a crust thereon and at a rate to draw the curd into close and adherent contact to the belt, whereby the protein curd is rendered resistant to subsequent upward currents of air.

2. In a method of drying protein wherein a soft protein curd is fed through a dryer on a screen, the improvement comprising passing drying air through the dryer vertically and generally countercurrently to the direction of passing protein therethrough, reheating the heavily moisture-laden exit drying air and drawing the reheated air downwardly through the protein curd to form a crust thereon and at a rate to draw the curd into close and adherent contact to the screen, whereby the protein curd is rendered resistant to subsequent upward currents of air.

EWALD ERICKSON.

REFERENCES CITED

The following references are of record in the file of this patent:

UNITED STATES PATENTS

| Number | Name | Date |
|---|---|---|
| Re. 14,528 | Andrews | Oct. 8, 1918 |
| 473,263 | Proctor | Apr. 19, 1892 |
| 712,894 | Ball | Nov. 4, 1902 |
| 1,572,326 | Straight | Feb. 9, 1926 |
| 1,707,929 | Bennett | Apr. 2, 1929 |